US010397646B2

(12) United States Patent
Cooper et al.

(10) Patent No.: US 10,397,646 B2
(45) Date of Patent: Aug. 27, 2019

(54) METHOD, SYSTEM, AND PROGRAM PRODUCT FOR MEASURING AUDIO VIDEO SYNCHRONIZATION USING LIP AND TEETH CHARACTERISTICS

(76) Inventors: J. Carl Cooper, Los Gatos, CA (US); Mirko Dusan Vojnovic, Santa Clara, CA (US); Jibanananda Roy, Kolkata (IN); Saurabh Jain, Kolkata (IN); Christopher Smith, Simsbury, CT (US)

( * ) Notice: Subject to any disclaimer, the term of this patent is extended or adjusted under 35 U.S.C. 154(b) by 2287 days.

(21) Appl. No.: 11/598,870

(22) Filed: Nov. 13, 2006

(65) Prior Publication Data
US 2007/0153089 A1 Jul. 5, 2007

Related U.S. Application Data

(63) Continuation-in-part of application No. PCT/US2005/041623, filed on Nov. 16, 2005, which
(Continued)

(51) Int. Cl.
*H04N 9/475* (2006.01)
*H04N 21/44* (2011.01)
(Continued)

(52) U.S. Cl.
CPC ... *H04N 21/44008* (2013.01); *G06K 9/00335* (2013.01); *H04N 17/00* (2013.01);
(Continued)

(58) Field of Classification Search
CPC ............. H04N 9/475; H04N 21/44008; H04N 21/2368; H04N 21/4341; H04N 17/00; H04N 5/04; G06K 9/00335
(Continued)

(56) References Cited

U.S. PATENT DOCUMENTS 4,313,135 A 1/1982 Cooper
4,665,431 A 5/1987 Cooper
(Continued)

OTHER PUBLICATIONS

"Audio-Vision: Locating sounds via audio-visual synchrony" Advances in Neural Information Processing Systems 12, edited by S. A. Solla, T. K. Leen, K-R Muller. MIT Press, Cambridge, Mass. (MIT Press, Cambridge, Mass., (c) 2000).
(Continued)

*Primary Examiner* — Trang U Tran

(57) ABSTRACT

Method, system, and program product for measuring audio video synchronization. This is done by first acquiring audio video information into an audio video synchronization system. The step of data acquisition is followed by analyzing the audio information, and analyzing the video information. Next, the audio information is analyzed to locate the presence of sounds therein related to a speaker's personal voice characteristics. In Analysis Phase Audio and Video MuEv-s are calculated from the audio and video information, and the audio and video information is classified into vowel sounds including AA, EE, OO, B, V, TH, F, silence, other sounds, and unclassified phonemes. The inner space between the lips are also identified and determined. This information is used to determine and associate a dominant audio class in a video frame. Matching locations are determined, and the offset of video and audio is determined.

35 Claims, 10 Drawing Sheets

Related U.S. Application Data is a continuation-in-part of application No. PCT/US2005/012588, filed on Apr. 13, 2005, which is a continuation of application No. 10/846,133, filed on May 14, 2004, now Pat. No. 7,499,104.

(60) Provisional application No. 60/471,176, filed on May 16, 2003.

(51) Int. Cl.
*G06K 9/00* (2006.01)
*H04N 17/00* (2006.01)
*H04N 21/2368* (2011.01)
*H04N 21/434* (2011.01)
*H04N 5/04* (2006.01)

(52) U.S. Cl.
CPC ..... *H04N 21/2368* (2013.01); *H04N 21/4341* (2013.01); *H04N 5/04* (2013.01)

(58) Field of Classification Search
USPC ....... 348/515, 512, 441, 461, 480, 516–518, 348/519, 571, 575, 722, 738, 699–700, 348/576; 382/118, 190
See application file for complete search history.

(56) References Cited

U.S. PATENT DOCUMENTS

| | | | |
|---|---|---|---|
| 4,703,355 A | 10/1987 | Cooper | |
| 4,769,845 A | 9/1988 | Nakamura | |
| 5,202,761 A | 4/1993 | Cooper | |
| 5,387,943 A | 2/1995 | Silver | |
| 5,530,483 A | 6/1996 | Cooper | |
| 5,550,594 A | 8/1996 | Cooper | |
| 5,572,261 A | 11/1996 | Cooper | |
| 5,675,388 A | 10/1997 | Cooper | |
| 5,751,368 A | 5/1998 | Cooper | |
| 5,880,788 A | 3/1999 | Bregler | |
| 5,920,842 A | 7/1999 | Cooper | |
| 5,946,049 A | 8/1999 | Cooper | |
| 6,098,046 A | 8/2000 | Cooper | |
| 6,141,057 A | 10/2000 | Cooper | |
| 6,330,033 B1 | 12/2001 | Cooper | |
| 6,351,281 B1 | 2/2002 | Cooper | |
| 6,392,707 B1 | 5/2002 | Cooper | |
| 6,421,636 B1 | 7/2002 | Cooper | |
| 6,469,741 B2 | 10/2002 | Cooper | |
| 6,989,869 B2 | 1/2006 | Cooper | |
| 2003/0128294 A1 | 7/2003 | Cooper et al. | |
| 2003/0179317 A1 | 7/2003 | Lundblad et al. | |
| 2004/0227856 A1 | 11/2004 | Cooper | |
| 2004/0243763 A1* | 12/2004 | Peters et al. | 711/114 |
| 2005/0052457 A1* | 3/2005 | Muncy et al. | 345/440 |
| 2005/0264800 A1 | 12/2005 | Yoshida et al. | |
| 2006/0262845 A1 | 12/2006 | Prakash et al. | |
| 2010/0185439 A1* | 7/2010 | Crockett | 704/200.1 |

OTHER PUBLICATIONS

"FaceSync: A linear operator for measuring synchronization of video facial images and audio tracks" available at www.slaney.org.
Lip-Sync: the Evaluation of Audio-to-VideoTiming Errors over Shot Intervals. A. Fedina, K. Glasman, Member, IEEE.

* cited by examiner

METHOD, SYSTEM, AND PROGRAM PRODUCT FOR MEASURING AUDIO VIDEO SYNCHRONIZATION USING LIP AND TEETH CHARACTERISTICS

RELATED APPLICATIONS

This application claims priority based on U.S. application Ser. No. 10/846,133, filed on May 14, 2004, and PCT Application No. PCT/US2005/012588, filed on Apr. 13, 2005, the text and drawings of which are incorporated herein by reference.

BACKGROUND

The invention relates to the creation, manipulation, transmission, storage, etc. and especially synchronization of multi-media entertainment, educational and other programming having at least video and associated information.

The creation, manipulation, transmission, storage, etc. of multi-media entertainment, educational and other programming having at least video and associated information requires synchronization. Typical examples of such programming are television and movie programs. Often these programs include a visual or video portion, an audible or audio portion, and may also include one or more various data type portions. Typical data type portions include closed captioning, narrative descriptions for the blind, additional program information data such as web sites and further information directives and various metadata included in compressed (such as for example MPEG and JPEG) systems.

Often the video and associated signal programs are produced, operated on, stored or conveyed in a manner such that the synchronization of various ones of the aforementioned audio, video and/or data is affected. For example the synchronization of audio and video, commonly known as lip sync, may be askew when the program is produced. If the program is produced with correct lip sync, that timing may be upset by subsequent operations, for example such as processing, storing or transmission of the program. It is important to recognize that a television program which is produced with lip sync intact may have the lip sync subsequently upset. That upset may be corrected by analyzing the audio and video signal processing delay differential which causes such subsequent upset. If the television program is initially produced with lip sync in error the subsequent correction of that error is much more difficult but can be corrected with the invention. Both these problems and their solutions via the invention will be appreciated from the teachings herein.

One aspect of multi-media programming is maintaining audio and video synchronization in audio-visual presentations, such as television programs, for example to prevent annoyances to the viewers, to facilitate further operations with the program or to facilitate analysis of the program. Various approaches to this challenge are described in issued patents. U.S. Pat. Nos. 4,313,135, 4,665,431; 4,703,355; U.S. Pat. No. Re. 33,535; U.S. Pat. Nos. 5,202,761; 5,530,483; 5,550,594; 5,572,261; 5,675,388; 5,751,368; 5,920,842; 5,946,049; 6,098,046; 6,141,057; 6,330,033; 6,351,281; 6,392,707; 6,421,636, 6,469,741 and 6,989,869. Generally these patents deal with detecting, maintaining and correcting lip sync and other types of video and related signal synchronization.

U.S. Pat. No. 5,572,261 describes the use of actual mouth images in the video signal to predict what syllables are being spoken and compare that information to sounds in the associated audio signal to measure the relative synchronization. Unfortunately when there are no images of the mouth, there is no ability to determine which syllables are being spoken.

As another example, in systems where the ability to measure the relation between audio and video portions of programs, an audio signal may correspond to one or more of a plurality of video signals, and it is desired to determine which. For example in a television studio where each of three speakers wears a microphone and each actor has a corresponding camera which takes images of the speaker, it is desirable to correlate the audio programming to the video signals from the cameras. One use of such correlation is to automatically select (for transmission or recording) the camera which televises the actor which is currently speaking. As another example when a particular camera is selected it is useful to select the audio corresponding to that video signal. In yet another example, it is useful to inspect an output video signal, and determine which of a group of video signals it corresponds to thereby facilitating automatic selection or timing of the corresponding audio. Commonly assigned patents describing these types of systems are described in U.S. Pat. Nos. 5,530,483 and 5,751,368.

The above patents are incorporated in their entirety herein by reference in respect to the prior art teachings they contain.

Generally, with the exception of U.S. Pat. Nos. 5,572,261, 5,530,483 and 5,751,368, the above patents describe operations without any inspection or response to the video signal images. Consequently the applicability of the descriptions of the patents is limited to particular systems where various video timing information, etc. is utilized. U.S. Pat. Nos. 5,530,483 and 5,751,368 deal with measuring video delays and identifying video signal by inspection of the images carried in the video signal, but do not make any comparison or other inspection of video and audio signals. U.S. Pat. No. 5,572,261 teaches the use of actual mouth images in the video signal and sounds in the associated audio signal to measure the relative synchronization. U.S. Pat. No. 5,572,261 describes a mode of operation of detecting the occurrence of mouth sounds in both the lips and audio. For example, when the lips take on a position used to make a sound like an E and an E is present in the audio, the time relation between the occurrences of these two events is used as a measure of the relative delay there between. The description in U.S. Pat. No. 5,572,261 describes the use of a common attribute for example such as particular sounds made by the lips, which can be detected in both audio and video signals. The detection and correlation of visual positioning of the lips corresponding to certain sounds and the audible presence of the corresponding sound is computationally intensive leading to high cost and complexity.

In a paper, J. Hershey, and J. R. Movellan ("Audio-Vision: Locating sounds via audio-visual synchrony" Advances in Neural Information Processing Systems 12, edited by S. A. Solla, T. K. Leen, K-R Muller. MIT Press, Cambridge, Mass. (MIT Press, Cambridge, Mass., (c) 2000)) it was recognized that sounds could be used to identify corresponding individual pixels in the video image. The correlation between the audio signal and individual ones of the pixels in the image were used to create movies that show the regions of the video that have high correlation with the audio and from the correlation data they estimate the centroid of image activity and use this to find the talking face. Hershey et al. described the ability to identify which of two speakers in a television image was speaking by correlating the sound and different parts of the face to detect synchronization. Hershey et al. noted, in particular, that "[i]t is interesting that the synchrony is shared by some parts, such as the eyes, that do not directly contribute to the sound, but contribute to the communication nonetheless." More particularly, Hershey et al. noted that these parts of the face, including the lips, contribute to the communication as well. There was no suggestion by Hershey and Movellan that their algorithms could measure synchronization or perform any of the other features of the invention. Again they specifically said that they do not directly contribute to the sound. In this reference, the algorithms merely identified who was speaking based on the movement or non movement of features.

In another paper, M. Slaney and M. Covell ("FaceSync: A linear operator for measuring synchronization of video facial images and audio tracks" available at www.slaney.org) described that Eigen Points could be used to identify lips of a speaker, whereas an algorithm by Yehia, Ruben, Batikiotis-Bateson could be used to operate on a corresponding audio signal to provide positions of the fiduciary points on the face. The similar lip fiduciary points from the image and fiduciary points from the Yehia algorithm were then used for a comparison to determine lip sync. Slaney and Covell went on to describe optimizing this comparison in "an optimal linear detector, equivalent to a Wiener filter, which combines the information from all the pixels to measure audio-video synchronization." Of particular note, "information from all of the pixels was used" in the FaceSync algorithm, thus decreasing the efficiency by taking information from clearly unrelated pixels. Further, the algorithm required the use of training to specific known face images, and was further described as "dependent on both training and testing data sizes." Additionally, while Slaney and Covell provided mathematical explanation of their algorithm, they did not reveal any practical manner to implement or operate the algorithm to accomplish the lip sync measurement. Importantly the Slaney and Covell approach relied on fiduciary points on the face, such as corners of the mouth and points on the lips.

Also, U.S. Pat. No. 5,387,943 of Silver, a method is described the requires that the mouth be identified by an operator. And, like U.S. Pat. No. 5,572,261 discussed above, utilizes video lip movements. In either of these references, only the mere lip movement is focused on. No other characteristic of the lips or other facial features, such as the shape of the lips, is considered in either of these disclosed methods. In particular, the spatial lip shape is not detected or considered in either of these referees, just the movement, opened or closed.

Perceptual aspects of the human voice, such as pitch, loudness, timbre and timing (related to tempo and rhythm) are usually considered to be more or less independent of one another and they are considered to be related to the acoustic signal's fundamental frequency $f_0$, amplitude, spectral envelope and time variation, respectively. Unfortunately, when conventional voice recognition techniques and synchronization techniques are attempted, they are greatly affected by individual speaker characteristics, such as low or high voice tones, accents, inflections and other voice characteristics that are difficult to recognize, quantify or otherwise identify.

It will be seen that it will be useful to recognize different movements of the lips and teeth of a speaker to better recognize different vowel sounds. Therefore, there exists a need in the art for an improved video and audio synchronization system that accounts for different mouth characteristics, such as lip, including inner area between the lips, and teeth characteristics. As will be seen, the invention accomplishes this in an elegant manner.

SUMMARY OF INVENTION

The shortcoming of the prior art are eliminated by the method, system, and program product described herein.

The invention provides for directly comparing images conveyed in the video portion of a signal to characteristics in an associated signal, such as an audio signal. More particularly, there is disclosed a method, system, and program product for measuring audio video synchronization that is independent of the particular characteristics of the speaker, whether it be a deep toned speaker such as a large man, or a high pitch toned speaker, such as a small woman. The invention is directed in one embodiment to measure the shape of the lips to consider the vowel and other tones created by such shape. Unlike conventional approaches that consider mere movement, opened or closed, the invention considers the shape and movement of the lips, providing substantially improved accuracy of audio and video synchronization of spoken words by video characters. Furthermore, unlike conventional approaches that consider mere movement, opened or closed, the invention considers the shape and may also consider movement of the lips. Furthermore, the invention provides a method for determining different spoken sounds by determining whether teeth are present between the open lips, such as when the letters "v" or "s", for example, are pronounced. A system configured according to the invention can thus reduce or remove one or more of the effects of different speaker related voice characteristics.

While the invention described in its preferred embodiment for use in synchronizing audio and video with human speakers, it will be understood that its application is not so limited and may be utilized with any sound source for which particular characteristics of timing and identification are desired to be located and/or identified. Just one example of such non-human sound source which the invention may be utilized with is computer generated speech.

We introduce the terms Audio and Video MuEv (ref. US Patent Application 20040227856). MuEv is the contraction of Mutual Event, to mean an event occurring in an image, signal or data which is unique enough that it may be accompanied by another MuEv in an associated signal. Such two MuEv-s are, for example, Audio and Video MuEv-s, where certain video quality (or sequence) corresponds to a unique and matching audio event.

The invention provides for directly comparing images conveyed in the video portion of a signal to characteristics in an associated signal, such as an audio signal. More particularly, there is disclosed a method, system, and program product for measuring audio video synchronization in a manner that is independent from a speaker's personal voice characteristics.

This is done by first acquiring Audio and Video MuEv-s from input audio-video signals, and using them to calibrate an audio video synchronization system. The MuEv acquisition and calibration phase is followed by analyzing the audio information, and analyzing the video information. From this Audio MuEv-s and Video MuEv-s are calculated from the audio and video information, and the audio and video information is classified into vowel sounds including, but not limited to, AA, EE, OO (capital double letters signifying the sounds of vowels a, e and o respectively), letters "s", "v", "z" and "f" i.e closed mouth shapes when teeth are present, letters "p", "b", "m", i.e closed mouth shapes where teeth are not present, silence, and other unclassified phonemes. This information is used to determine and associate a dominant audio class with one or more corresponding video frames. Matching locations are determined, and the offset of video and audio is determined. A simply explained example is that the sound EE (an audio MuEv) may be identified as occurring in the audio information and matched to a corresponding image characteristic like lips forming a shape associated with speaking the vowel EE (a video MuEv) with the relative timing thereof being measured or otherwise utilized to determine or correct a lip sync error.

The invention provides for directly comparing images conveyed in the video portion of a signal to characteristics in an associated signal, such as an audio signal. More particularly, there is disclosed a method, system, and program product for measuring audio video synchronization. This is done by first acquiring the data into an audio video synchronization system by receiving audio video information. Data acquisition is performed in a manner such that the time of the data acquisition may be later utilized in respect to determining relative audio and video timing. In this regard it is preferred that audio and video data be captured at the same time and be stored in memory at known locations so that it is possible to recall from memory audio and video which were initially time coincident simply by reference to such known memory location. Such recall from memory may be simultaneous for audio and video or as needed to facilitate processing. Other methods of data acquisition, storage and recall may be utilized however and may be tailored to specific applications of the invention. For example data may be analyzed as it is captured without intermediate storage.

It is preferred that data acquisition be followed by analyzing the captured audio information, and analyzing the captured video information. From this a glottal pulse is calculated from the audio and video information, and the audio and video information is classified into vowel sounds including AA, EE, OO, silence, and unclassified phonemes This information is used to determine and associate a dominant audio class in a video frame. Matching locations are determined, and the offset of video and audio is determined.

One aspect of the invention is a method for measuring audio video synchronization. The method comprises the steps of first receiving a video portion and an associated audio portion of, for example, a television program; analyzing the audio portion to locate the presence of particular phonemes therein, and also analyzing the video portion to locate therein the presence of particular visemes therein. This is followed by analyzing the phonemes and the visemes to determine the relative timing of related phonemes and visemes thereof and locate MuEvs.

Another aspect of the invention is a method for measuring audio video synchronization by receiving video and associated audio information, analyzing the audio information to locate the presence of particular sounds and analyzing the video information to locate the presence of lip shapes corresponding to the formation of particular sounds, and comparing the location of particular sounds with the location of corresponding lip shapes of step to determine the relative timing of audio and video, e.g., MuEvs.

A further aspect of the invention is directed to a system and method for particularly analyzing the inner lip region. In operation, for viseme recognition, a process is provided that accurately extracts and examines the lip region. A narrow strip on the central portion of the lips is analyzed to estimate the percentage of lips (upper and lower), teeth and open space between teeth. The process accurately detects closed lips, wide open mouth and all teeth and lips.

A further aspect of the invention is a method for measuring audio video synchronization, comprising the steps of receiving a video portion and an associated audio portion of a television program, and analyzing the audio portion to locate the presence of particular vowel sounds while analyzing the video portion to locate the presence of lip shapes corresponding to uttering particular vowel sounds, and analyzing the presence and/or location of vowel sounds located in step b) with the location of corresponding lip shapes of step c) to determine the relative timing thereof. The invention further analyzes the audio portion for personal voice characteristics that are unique to a speaker and filters this out. Thus, an audio representation of the spoken voice related to a given video frame can be substantially standardized, where the personal characteristics of a speaker's voice is substantially filtered out.

The invention provides methods, systems, and program products for identifying and locating MuEvs. As used herein the term "MuEv" is the contraction of MUtual EVent to mean an event occurring in an image, signal or data which is unique enough that it may be accompanied by another MuEv in an associated signal. Accordingly, an image MuEv may have a probability of matching a MuEv in an associated signal. For example in respect to a bat hitting the baseball, the crack of the bat in the audio signal is a MuEv, the swing of the bat is a MuEv and the ball instantly changing direction is also a MuEv. Clearly each MuEv has a probability of matching the others in time. The detection of a video MuEv may be accomplished by looking for motion, and in particular quick motion in one or a few limited areas of the image while the rest of the image is static, i.e. the pitcher throwing the ball and the batter swinging at the ball. In the audio, the crack of the bat may be detected by looking for short, percussive sounds which are isolated in time from other short percussive sounds. One of ordinary skill in the art will recognize from these teachings that other MuEvs may be identified in associated signals and utilized for the invention.

THE FIGURES

Various embodiments and exemplifications of our invention are illustrated in the Figures.

DETAILED DESCRIPTION

The preferred embodiment of the invention has an image input, an image mutual event identifier which provides image MuEvs, and an associated information input, an associated information mutual event identifier which provides associated information MuEvs. The image MuEvs and associated information MuEvs are suitably coupled to a comparison operation which compares the two types of MuEvs to determine their relative timing. In particular embodiments of the invention, MuEvs may be labeled in regard to the method of conveying images or associated information, or may be labeled in regard to the nature of the images or associated information. For example video MuEv, brightness MuEv, red MuEv, chroma MuEv and luma MuEv are some types of image MuEvs and audio MuEv, data MuEv, weight MuEv, speed MuEv and temperature MuEv are some types of associated MuEvs which may be commonly utilized.

Figure 1:
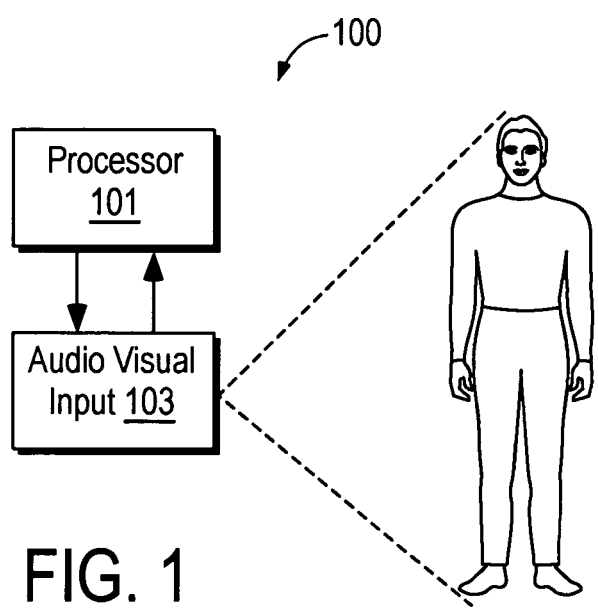
FIG. 1 is an overview of a system for carrying out the method of the invention.
Figure 2:
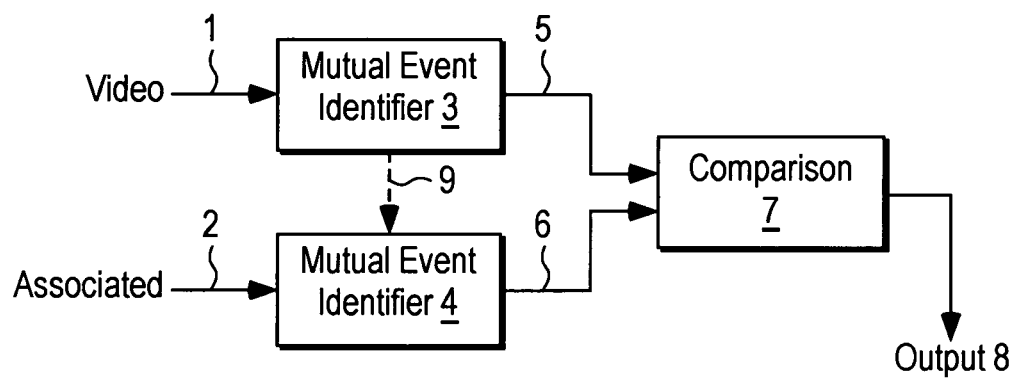
FIG. 2 shows a diagram of the invention with images conveyed by a video signal and associated information conveyed by an associated signal and a synchronization output.
Figure 3:
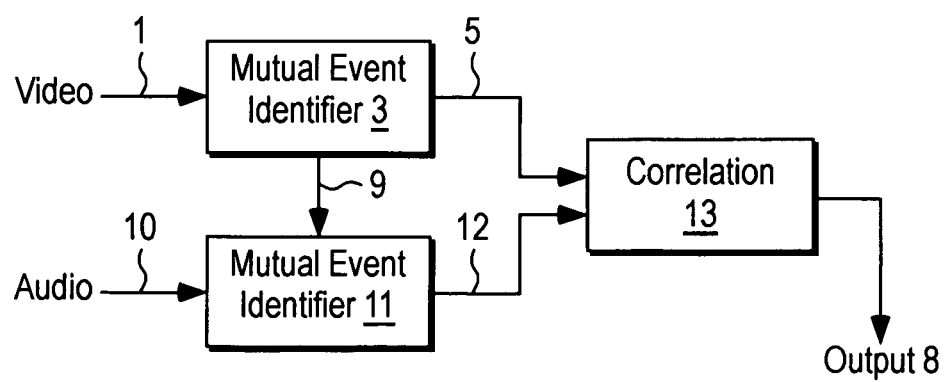
FIG. 3 shows a diagram of the invention as used with a video signal conveying images and an audio signal conveying associated information.

FIG. 1 shows the preferred embodiment of the invention wherein video conveys the images and an associated signal conveying the associated information. FIG. 2 has video input 1, mutual event identifier 3 with MuEv output 5, associated signal input 2, mutual event identifier 4 with MuEv output 6, comparison 7 with output 8.

In operation video signal 1 is coupled to an image MuEv identifier 3 which operates to compare a plurality of image frames of video to identify the movement (if present) of elements within the image conveyed by the video signal. The computation of motion vectors, commonly utilized with video compression such as in MPEG compression, is useful for this function. It is useful to discard motion vectors which indicate only small amounts of motion and use only motion vectors indicating significant motion in the order of 5% of the picture height or more. When such movement is detected, it is inspected in relation to the rest of the video signal movement to determine if it is an event which is likely to have a corresponding MuEv in the associated signal. In one embodiment, a motion based video MuEv detection is used only as a fallback when none of the other described methods, such as lip shape for example, is available due to the any particular video content. The reason is that if a lip shaped detection is available, it is preferred over motion detection (and also over the lip motion method of '261 patent discussed above) because it is much more accurate owing to the greater ability to match particular sounds (AA, OO, EE for example) rather than just motion based approach. This is because strictly motion based detection can be fooled by different sounds that are generated with the same motion. In addition, lip shaped detection can be performed in a single frame, whereas motion based detection requires a plurality of frames.

A MuEv output is generated at 5 indicating the presence of the MuEv(s) within the video field or frame(s), in this example where there is movement that is likely to have a corresponding MuEv in the associated signal. In the preferred form it is desired that a binary number be output for each frame with the number indicating the number of MuEvs, i.e. small region elements which moved in that frame relative to the previous frame, while the remaining portion of the frame remained relatively static.

It may be noted that while video is indicated as the preferred method of conveying images to the image MuEv identifier 3, other types of image conveyances such as files, clips, data, etc. may be utilized as the operation of the invention is not restricted to the particular manner in which the images are conveyed. Other types of image MuEvs may be utilized as well in order to optimize the invention for particular video signals or particular types of expected images conveyed by the video signal. For example the use of brightness changes within particular regions, changes in the video signal envelope, changes in the frequency or energy content of the video signal carrying the images and other changes in properties of the video signal may be utilized as well, either alone or in combination, to generate MuEvs. The associated signal 2 is coupled to a mutual event identifier 4 which is configured to identify the occurrence of associated signal MuEvs within the associated signal. When MuEvs are identified as occurring in the associated signal a MuEv output is provided at 6. The MuEv output is preferred to be a binary number indicating the number of MuEvs which have occurred within a contiguous segment of the associates signal 2, and in particular within a segment corresponding in length to the field or frame period of the video signal 1 which is utilized for outputting the movement signal number 5. This time period may be coupled from movement identifier 3 to MuEv identifier 4 via suitable coupling 9 as will be known to persons of ordinary skill in the art from the description herein. Alternatively, video 1 may be coupled directly to MuEv identifier 4 for this and other purposes as will be known from these present teachings.

It may be noted that while a signal is indicated as the preferred method of conveying the associated information to the associated information MuEv identifier 4, other types of associated information conveyances such as files, clips, data, etc. may be utilized as the operation of the invention is not restricted to the particular manner in which the associated information is conveyed. In the preferred embodiment of FIG. 1 the associated information is also known as the associated signal, owing to the preferred use of a signal for conveyance. Similarly, the associated information MuEvs are also known as associated signal MuEvs. The detection of MuEvs in the associated signal will depend in large part on the nature of the associated signal. For example data which is provided by or in response to a device which is likely present in the image such as data coming from the customer input to a teller machine would be a good MuEv. Audio characteristics which are likely correlated with motion are good MuEvs as discussed below. As other examples, the use of changes within particular regions of the associated signal, changes in the signal envelope, changes in the information, frequency or energy content of the signal and other changes in properties of the signal may be utilized as well, either alone or in combination, to generate MuEvs. More details of identification of MuEvs in particular signal types will be provided below in respect to the detailed embodiments of the invention.

Consequently, at every image, conveyed as a video field or frame period, a MuEv output is presented at 5 and a MuEv output is presented at 6. The image MuEv output, also known in this preferred embodiment as a video MuEv owing to the use of video as the method of conveying images, and the associated signal MuEv output are suitable coupled to comparison 7 which operates to determine the best match, on a sliding time scale, of the two outputs. In the preferred embodiment the comparison is preferred to be a correlation which determines the best match between the two signals and the relative time therebetween.

We implement AVSync (Audio Video Sync detection) based on the recognition of Muevs such as vowel sounds, silence, and consonant sounds, including, preferably, at least three vowel sounds and silence. Exemplary of the vowel sounds are the three vowel sounds, /AA/, /EE/ and /OO/. The process described herein assumes speaker independence in its final implementation.

Figure 4:
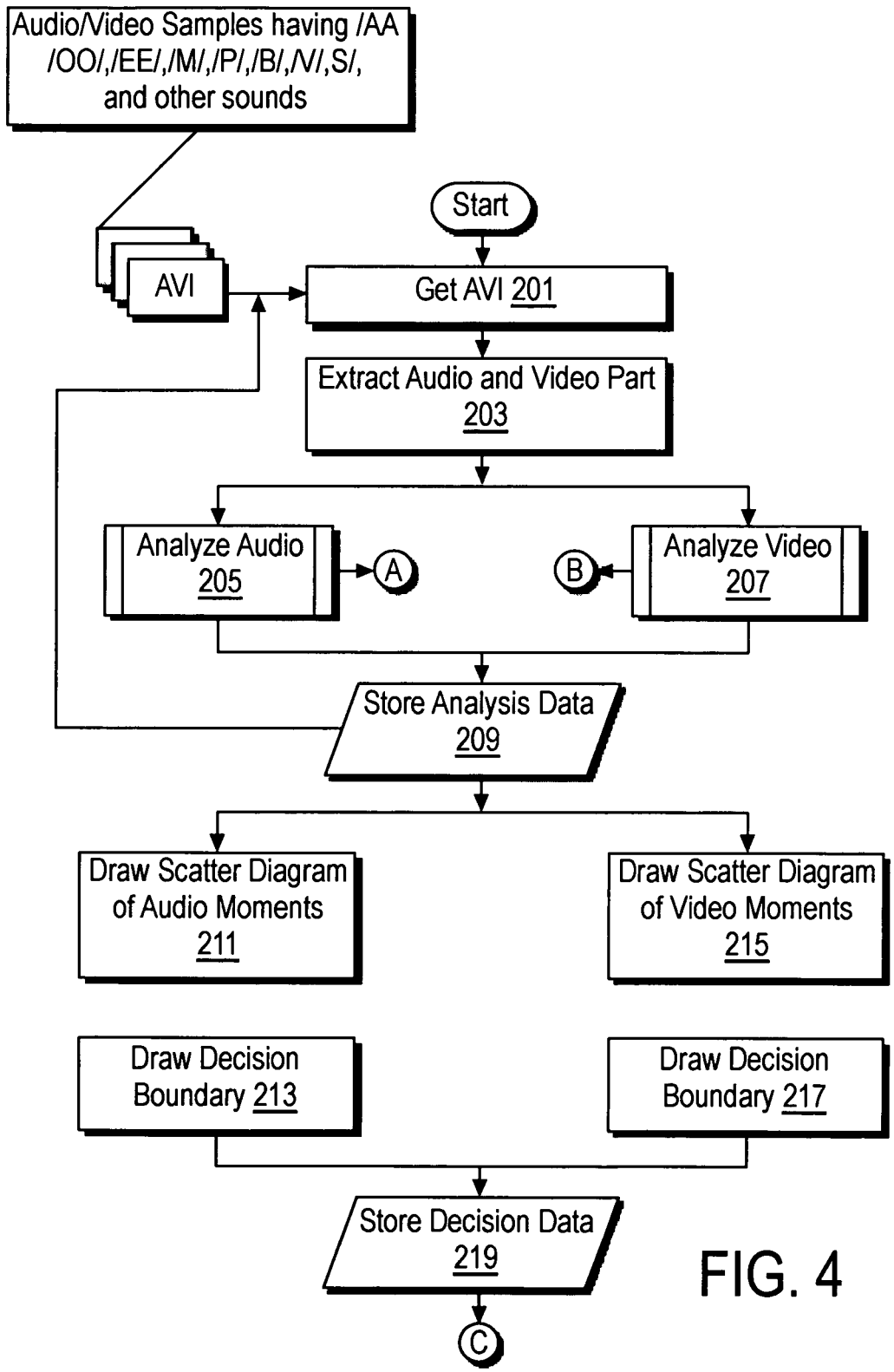
FIG. 4 is a flow chart illustrating the "Data Acquisition Phase", also referred to as an "A/V MuEv Acquisition and Calibration Phase" of the method of the invention.

The first phase is an initial data acquisition phase, also referred to as an Audio/Video MuEv Acquisition and Calibration Phase shown generally in FIG. 4. In the initial data acquisition phase, experimental data is used to create decision boundaries and establish segmented audio regions for phonemes, that is, Audio MuEv's, /AA/, /OO/, /EE/. The methodology is not limited to only three vowels, but it can be expanded to include other vowels, or syllables, such as "lip-biting" "V" and "F", etc.

At the same time corresponding visemes, that is, Video MuEvs, are created to establish distinctive video regions.

Those are used later, during the AVI analysis, positions of these vowels are identified in Audio and Video stream. Analyzing the vowel position in audio and the detected vowel in the corresponding video frame, audio-video synchronicity is estimated.

In addition to Audio-Video MuEv matching the silence breaks in both audio and video are detected and used to establish the degree of A/V synchronization.

During the AVI analysis, the positions of these vowels are identified in the Audio and Video stream. Audio-video synchronicity is estimated by analyzing the vowel position in audio and the detected vowel in the corresponding video frame.

In addition to phoneme-viseme matching the silence breaks in both audio and video may be detected and used to establish the degree of A/V synchronization.

Figure 5:
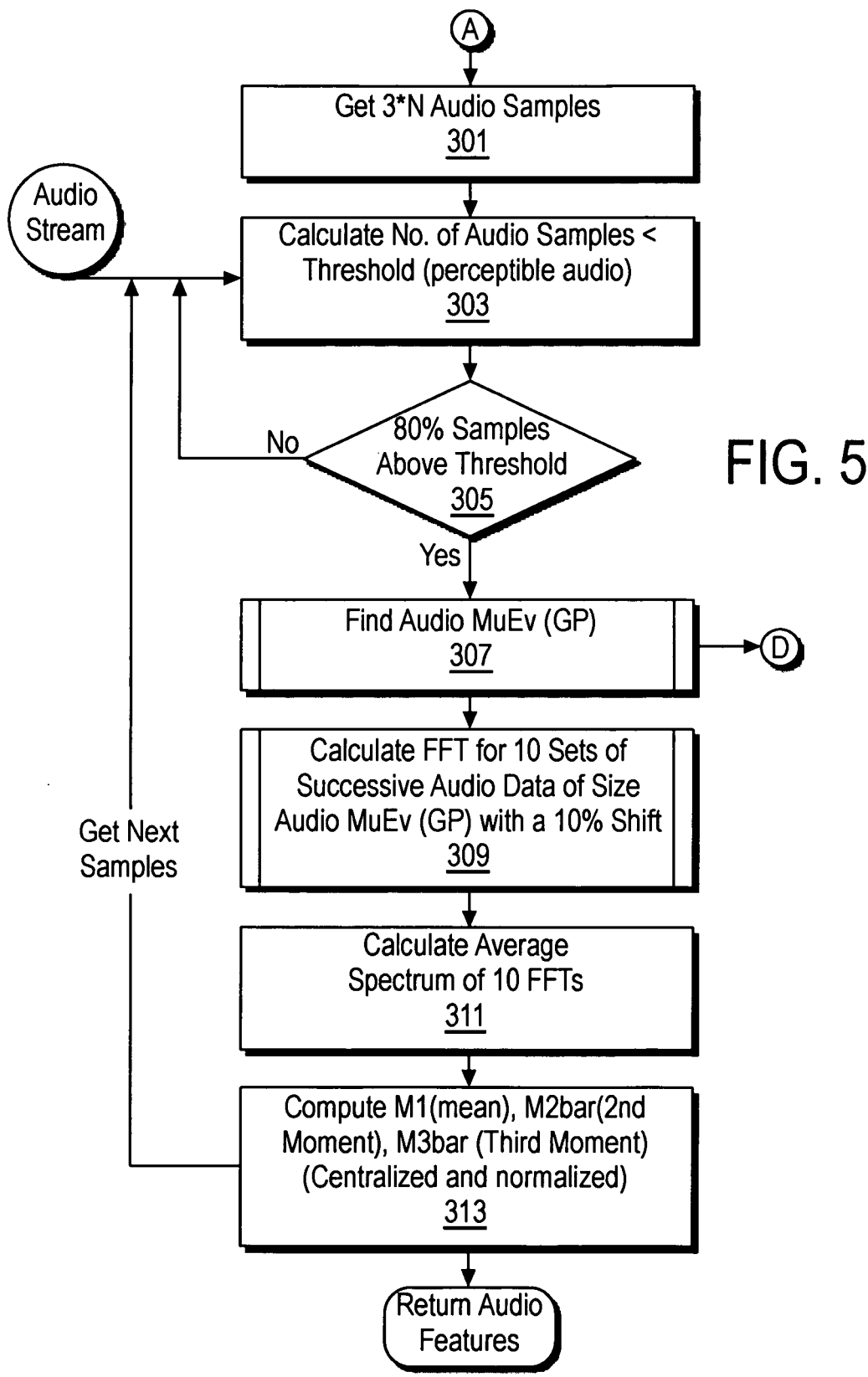
FIG. 5 is a flow chart illustrating the "Audio Analysis Phase" of the method of the invention.
Figure 6A:
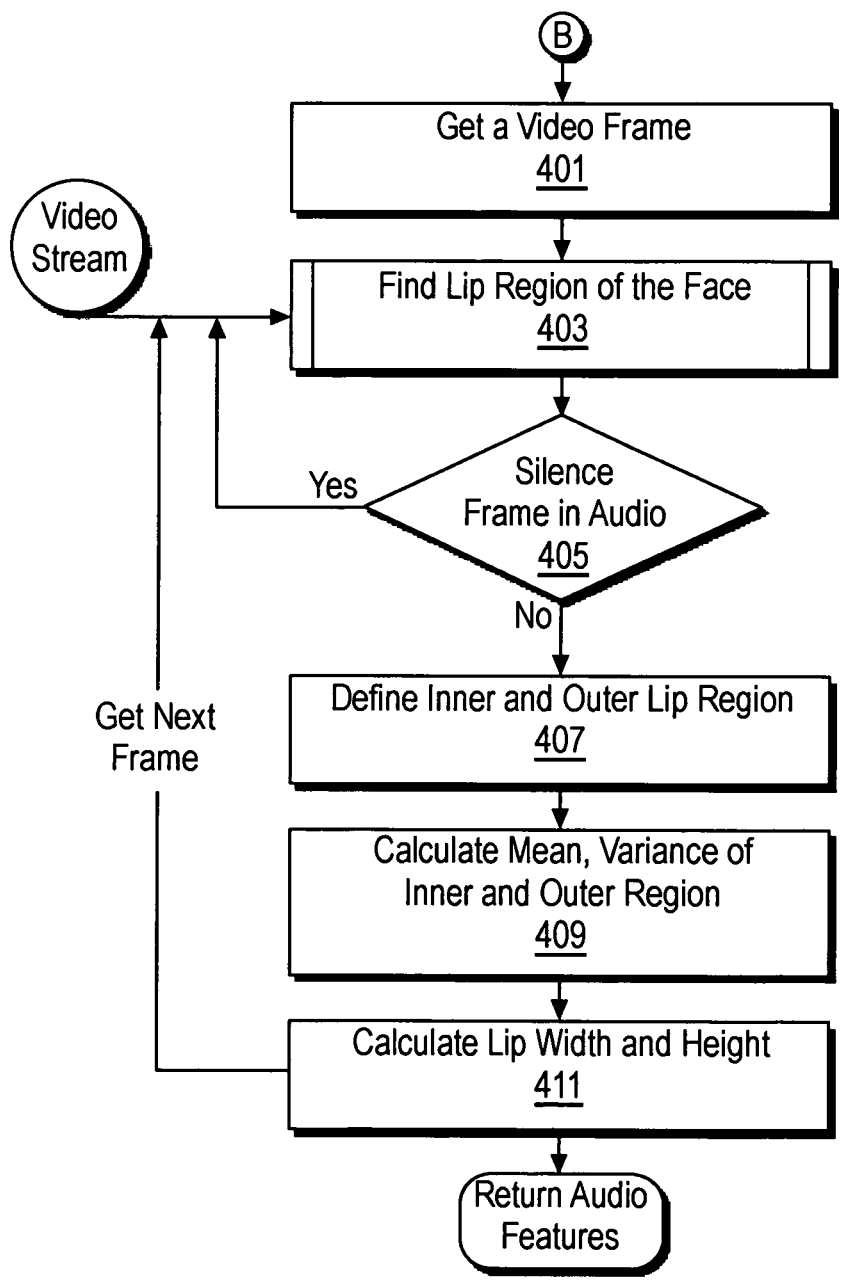
FIG. 6 is a flow chart illustrating the Video Analysis of the method of the invention.

The next steps are Audio MuEv analysis and classification as shown in FIG. 5 and Video MuEv analysis and classification as shown in FIG. 6a. Audio MuEv classification is based on Glottal Pulse analysis. In Glottal Pulse analysis shown and described in detail in FIG. 5, audio samples are collected and glottal pulses from audio samples in non-silence zones are calculated. For each glottal pulse period, the Mean, and the Second and Third Moments are computed. The moments are centralized and normalized around the mean. The moments are plotted as a scattergram in FIG. 6(b) discussed below. Decision boundaries, which separated most of the vowel classes are drawn and stored as parameters for audio classification.

Figure 6B:
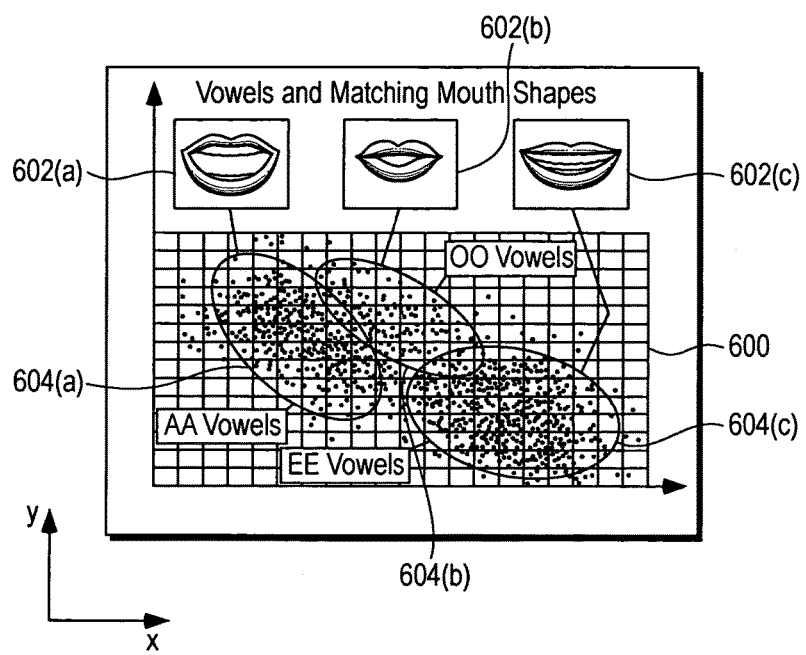

In the substantially parallel stage of Video Analysis and Classification, shown and described in greater detail in FIG. 6b, the lip region for each video frame is extracted employing a face detector and lip tracker. The intensity values are preferably normalized to remove any uneven lighting effects. The lip region is divided into sub-regions, typically three sub-regions—inner, outer and difference region. The inner region is formed by removing about 25% of the pixels from all four sides of the outer lip region. The difference of the outer lip-region and the inner region is considered a difference region. Mean and standard deviation of all three regions are calculated. The mean/standard deviation of these regions is considered as video measure of spoken vowels, thus forming a corresponding Video MuEv. Note that this Video MuEv is substantially based on the outer, inner and difference regions which in turn are based substantially on lip shape, rather than mere lip movement. A system configured with this method of finding Video MuEvs is capable of finding more MuEvs than a conventional system, that is typically a strictly motion based system. For example, a lip shape corresponding to a speaker's vowel sound of "EE" can be identified for each frame in which the shape is present. By comparison, using a system that uses mere lip movement to determine an EE sound would take several frames to find, since the redundant measuring of this motion of the lips over those several frames would be needed to establish which sound the lips are making. According to the invention, taking into account the shape of the lips substantially reduces the number of frames needed to determine the sound that the speaker is making. Also, according to the invention, the particular teachings of the manner in which the shape of the lips may be discerned by a system. These teachings may be utilized to provide substantially faster identification of the sound that the lips are making and higher accuracy of alignment.

Figure 7:
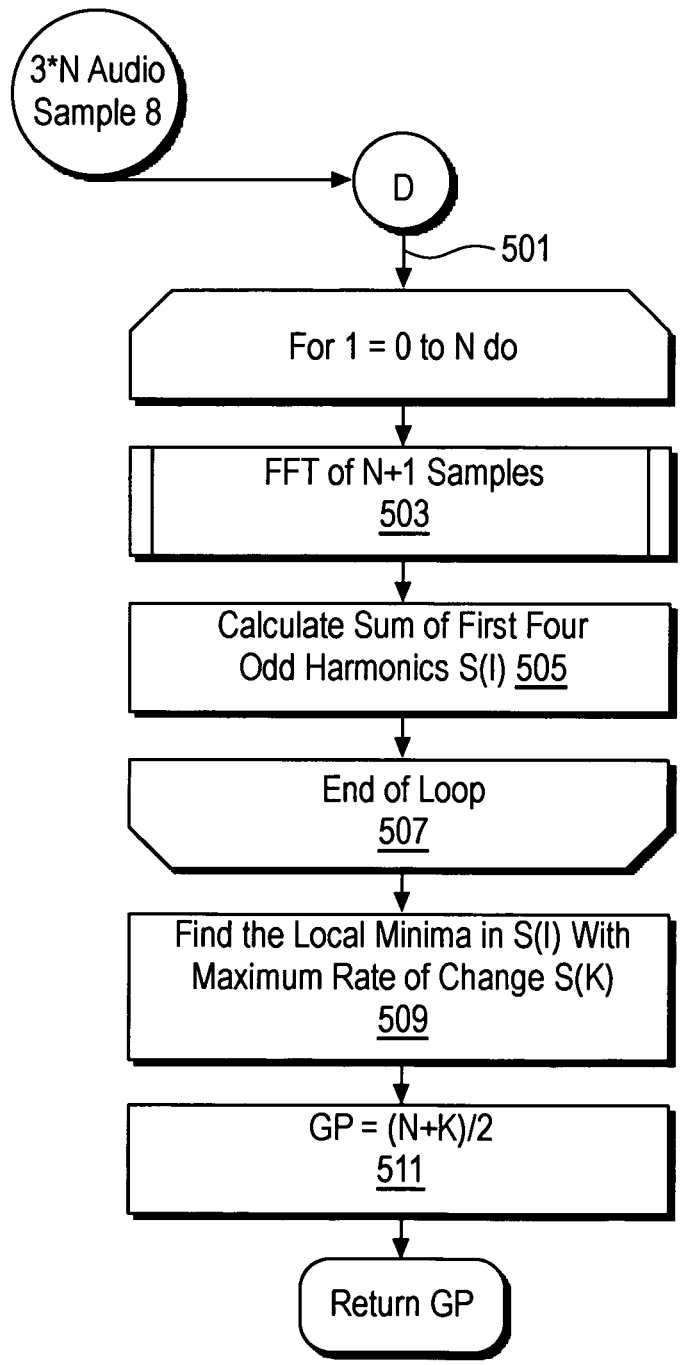
FIG. 7 is a flow chart illustrating the derivation and calculation of the Audio MuEv, also referred to as a Glottal Pulse.

In the next phase, the detection phase, shown and described in greater detail in FIG. 7. One possible implementation of the detection phase, shown in FIG. 7, is to process the test data frame by frame. A large number of samples, e.g., about 450 audio samples or more, are taken as the audio window. For each audio window having more then some fraction, for example, 80%, non-silence data is processed to calculate an audio MuEv or GP (glottal pulse). The audio features are computed for Audio MuEv or GP samples. The average spectrum values over a plurality of audio frames, for example, over 10 or more consecutive audio frames with 10% shift, are used for this purpose. These are classified into vowel sounds such as /AA/, /OO/, /EE/, and into other vowel sounds, consonant sounds, and "F" and "V" sounds—such as when teeth are present in the video. For all those samples having more than two consecutive classes same, the corresponding video frame is checked. The video features for this frame are computed and classified as a corresponding video MuEv. The synchronicity is verified by analyzing these data.

Figure 8:
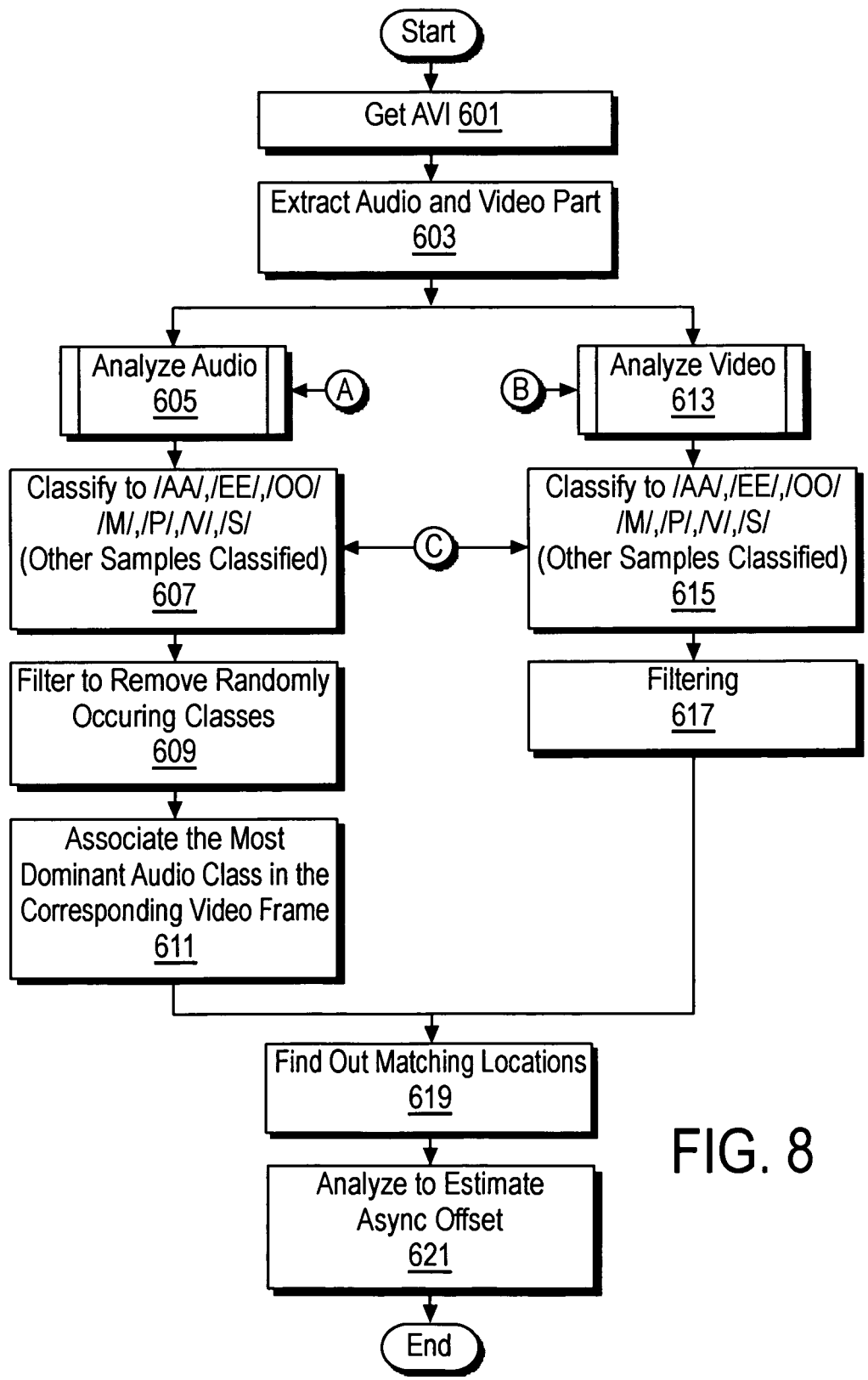
FIG. 8 is a flow chart illustrating the Test Phase of the method of the invention.

In the test phase, as shown and described in greater detail in FIG. 8, a dominant audio class in a video frame is determined and associated to a video frame to define a MuEv. This is accomplished by locating matching locations, and estimating offset of audio and video.

The step of acquiring data in an audio video synchronization system with input audio video information, that is, of Audio/Video MuEv Acquisition and Calibration, is as shown in FIG. 4. Data acquisition includes the steps of receiving audio video information 201, separately extracting the audio information and the video information 203, analyzing the audio information 205 and the video information 207, and recovering audio and video analysis data there from. The audio and video data is stored 209 and recycled.

Analyzing the data includes drawing scatter diagrams of audio moments from the audio data 211, drawing an audio decision boundary and storing the resulting audio decision data 213, drawing scatter diagrams of video moments from the video data 215. and drawing a video decision boundary 217 and storing the resulting video decision data 219

The audio information is analyzed, for example by a method such as is shown in FIG. 5. This method includes the steps of receiving an audio stream 301 until the fraction of captured audio samples reaches a threshold 303. If the fraction of captured audio reaches the threshold, the audio MuEv or glottal pulse of the captured audio samples is determined 307. The next step is calculating a Fast Fourier Transform (or Discrete Cosine Transform, or DCT) for sets of successive audio data of the size of the audio MuEvs or glottal pulses within a shift 309. This is done by calculating an average frequency spectrum of the Fast Fourier Transforms (or DCT) 311. and then calculating the audio statistics of the frequency spectrum of the Fast Fourier Transforms (or DCT) of the glottal pulses 313; and returning the audio statistics. The detected audio statistics 313 include one or more of the centralized and normalized M1 (mean), M2BAR ($2^{nd}$ Moment), M3BAR ($3^{rd}$ Moment), where "BAR" means logical "not". This is discussed and detailed further below.

As shown in FIG. 7, calculating an audio MuEv or glottal pulse from the audio and video information to find an audio MuEv or glottal pulse of the captured audio samples by a method comprising the steps of receiving 3N audio samples 501, and for i=0 to N samples carrying out the steps of
  i) determine the Fast Fourier Transform (or DCT) of N+1 audio samples 503;
  ii) calculating a sum of the first four odd harmonics, S(I) 505;
  iii) finding a local minima of S(I) with a maximum rate of change, S(K) 507; and
  iv) calculating the audio MuEv or glottal pulse, GP=(N+K)/2 509.

The analysis of video information is as shown in FIG. 6(a) by a method that includes the steps of receiving a video stream and obtaining a video frame from the video frame 401, finding a lip region of a face in the video frame 403, and if the video frame is a silence frame, receiving a subsequent video frame 405. If the video frame is not a silence frame, it is preferred that the inner and outer lip regions of the face are defined 407, the mean and variance of the inner and outer lip regions of the face are calculated 409, and the width and height of the lips are calculated 411. This method provides spatially based MuEvs that are not motion dependent. Again note that all of this spatially based information may be derived from a single frame, or even a single field, of video. Thus the potential of quickly finding many spatially based video MuEvs is substantially increased, as compared to a conventional motion based (temporal) analysis of lip movement. That is not to say, however, that movement based MuEvs are not useful, and they may be utilized alone or in combination with the spatially based MuEvs if desired. At the end of the process, the video features are returned and the next frame is received.

Referring to FIG. 6(b), an illustration of a scatter diagram 600 showing vowels and matching mouth shapes is shown. There are three views of a speaker, 602a, 602b and 602c. As can be seen, the different mouth shapes illustrated correspond to different vowel sounds. Their corresponding sounds can be plotted on scatter diagram 600. The Y axis is the Y component of the moment based measure, and the X axis is the X component of the moment based measure. The mouth shape of speaker 602a makes the /AA/ vowel sound as shown, and the scatter diagram output of the sound can be seen by the points on the scatter diagram 604a. The mouth shape is open, as is the case when the /AA/ vowel is spoken. Similarly, speaker shape 602b outputs vowel sound /OO/, and the output of the sound is illustrated in the scatter points 604b. Again, the mouth is open, but the shape is different for the /OO/ sound than the prior illustrated /AA/ sound. According to the invention, the different mouth shapes correspond to the different sounds, including vowels and other sounds such as /V/, /F/, /S/, /ZZ/, and many other sounds. Shape 602c has a shape that corresponds to the /EE/ vowel, and the scatter diagram illustrates the corresponding points 604c, which are in different locations on the diagram than the /AA/ sound and the /OO/ shape. Thus, the illustration shows how a scatter diagram can define the different sounds according to the moment based measure, and also shows how distinctive the different sounds and corresponding mouth shapes are distinctive.

Determining and associating a dominant audio class in a video frame, locating matching locations, and estimating offset of audio and video by a method such as shown in FIG. 8. This method includes the steps of receiving a stream of audio and video information 601, retrieving individual audio and video information 603, analyzing the audio 605 and video information 613 and classifying the audio 607, which includes /AA/, /EE/, /OO/ /M/, /P/, /B/, /V/, /S/ and other sounds, and video information 615, which includes /AA/, /EE/, /OO/, /M/, /P/, /B/, /V/, /S/ and other sounds. Different sounds may be utilized in this process, and the invention may be practiced utilizing different sounds. Those skilled in the art will understand that, given this specification, different sounds can be utilized in order to fit a particular desired level of performance versus complexity without departing from the invention.

The illustrations show that the sounds classified in the audio analysis and the video analysis are the same. It is possible in different situations, however, that they may be different. While different sounds than those suggested could be used, they would typically be the same for both sides. In one embodiment, it may be useful to use a larger (overlapping) set of different sounds for one (either audio or video) than for the other due to ease or difficulty of processing. For example in video, a system may use /AA/, /EE/, /OO/, /M/, /P/, /B/, /V/, /S/, but if the audio is noisy or distorted or for some other reason related to the application might only use /AA/, /EE/, and /OO/. The reverse could happen if the video were noisy or distorted and the audio were clean. The signal (audio or video) which was inherently more difficult to process because of its content or lack thereof might (temporarily) use less classified sounds than the other signal (video or audio). Video where there is no presence of a head, for example, might use two, one or none for the duration of no head. Video with lots of talking heads might initially use a small set while it identifies which head is the one corresponding to the sound (i.e. which head has the microphone). In another embodiment, while acquiring a new image or audio, a smaller set may be used to speed acquisition followed by use of a larger set to facilitate accuracy after initial acquisition. This smaller set/larger set could take place with both audio and video or either one.

This is followed by filtering the audio 609 and video information 617 to remove randomly occurring classes, and associating the most dominant audio classes to corresponding video frames 611, finding matching locations 619; and estimating an asynchronous offset. 621.

The audio and video information is classified into vowel sounds including at least AA, EE, OO, silence, the /M/, /P/, /B/, /V/, /S/ and other sounds, and unclassified phonemes This is without precluding other vowel sounds, and also consonant sounds.

A further aspect of our invention is a system for carrying out the above described method of measuring audio video synchronization. This is done by a method comprising the steps of Initial A/V MuEv Acquisition and Calibration Phase of an audio video synchronization system thus establishing a correlation of related Audio and Video MuEv-s, and Analysis phase which involves taking input audio video information, analyzing the audio information, analyzing the video information, calculating Audio MuEv and Video MuEv from the audio and video information; and determining and associating a dominant audio class in a video frame, locating matching locations, and estimating offset of audio and video.

A further aspect of our invention is a program product comprising computer readable code for measuring audio video synchronization. This is done by a method comprising the steps of Initial A/V MuEv Acquisition and Calibration Phase of an audio video synchronization system thus establishing a correlation of related Audio and Video MuEv-s, and Analysis phase which involves taking input audio video information, analyzing the audio information, analyzing the video information, calculating Audio MuEv and Video MuEv from the audio and video information; and determining and associating a dominant audio class in a video frame, locating matching locations, and estimating offset of audio and video.

The invention may be implemented, for example, by having the various means of receiving video signals and associated signals, identifying Audio-visual events and comparing video signal and associated signal Audio-visual events to determine relative timing as a software application (as an operating system element), a dedicated processor, or a dedicated processor with dedicated code. The software executes a sequence of machine-readable instructions, which can also be referred to as code. These instructions may reside in various types of signal-bearing media. In this respect, one aspect of the invention concerns a program product, comprising a signal-bearing medium or signal-bearing media tangibly embodying a program of machine-readable instructions executable by a digital processing apparatus to perform a method for receiving video signals and associated signals, identifying Audio-visual events and comparing video signal and associated signal Audio-visual events to determine relative timing.

This signal-bearing medium may comprise, for example, memory in server. The memory in the server may be non-volatile storage, a data disc, or even memory on a vendor server for downloading to a processor for installation. Alternatively, the instructions may be embodied in a signal-bearing medium such as the optical data storage disc. Alternatively, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, lattice and 3 dimensional array type optical storage, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++".

Additionally, the program code may, for example, be compressed, encrypted, or both, and may include executable files, script files and wizards for installation, as in Zip files and cab files. As used herein the term machine-readable instructions or code residing in or on signal-bearing media include all of the above means of delivery.

Audio MuEv (Glottal Pulse) Analysis. The method, system, and program product described is based on glottal pulse analysis. The concept of glottal pulse arises from the short comings of other voice analysis and conversion methods. Specifically, the majority of prior art voice conversion methods deal mostly with the spectral features of voice. However, a short coming of spectral analysis is that the voice's source characteristics cannot be entirely manipulated in the spectral domain. The voice's source characteristics affect the voice quality of speech defining if a voice will have a modal (normal), pressed, breathy, creaky, harsh or whispery quality. The quality of voice is affected by the shape length, thickness, mass and tension of the vocal folds, and by the volume and frequency of the pulse flow.

A complete voice conversion method needs to include a mapping of the source characteristics. The voice quality characteristics (as referred to glottal pulse) are much more obvious in the time domain than in the frequency domain. One method of obtaining the glottal pulse begins by deriving an estimate of the shape of the glottal pulse in the time domain. The estimate of the glottal pulse improves the source and the vocal tract deconvolution and the accuracy of formant estimation and mapping.

Figure 9:
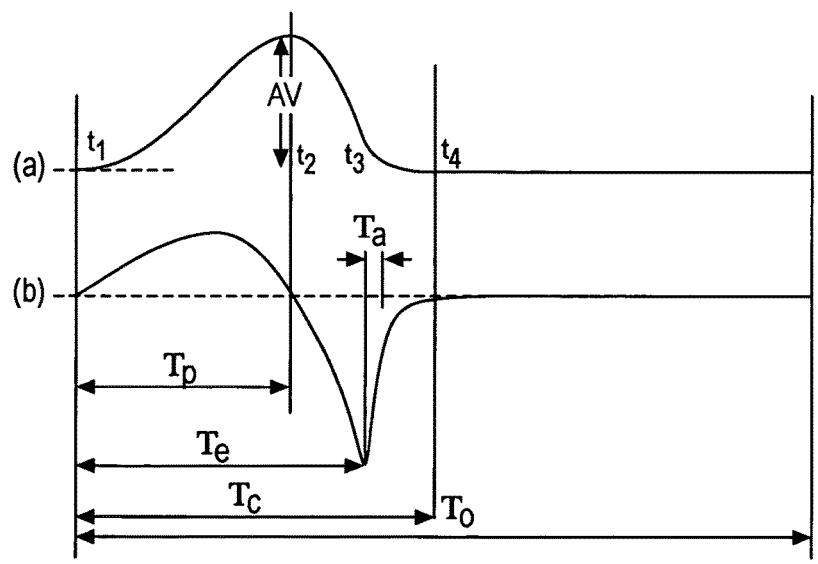
FIG. 9 is a flow chart illustrating the characteristics of the Audio MuEv also referred to as a Glottal Pulse.

According to one method of glottal pulse analysis, a number of parameters, the laryngeal parameters are used to describe the glottal pulse. The parameters are based on the LF (Liljencrants/Fant) model illustrated in FIG. 9. According to LF model the glottal pulse has two main distinct time characteristics: the open quotient ($OQ=T_e/T_0$) is the fraction of each period the vocal folds remain open and the skew of the pulse or speed quotient ($a=T_p/T_e$) is the ratio of $T_p$, the duration of the opening phase of the open phase, to $T_e$, the total duration of the open phase of the vocal folds. To complete the glottal flow description, the pitch period $T_0$, the rate of closure ($RC=(T_e-T_p)/T_e$) and the magnitude (AV) are included.

Estimation of the five parameters of LF model requires an estimation of the glottal closure instant (GCI). The estimation of the GCI exploits the fact that the average group delay value of the minimum phase signal is proportional to the shift between the start of the signal and the start of the analysis window. At the instant when the two coincide, the average group delay is of zero value. The analysis window length is set to a value that is just slightly higher that the corresponding pitch period. It is shifted in time by one sample across the signal and each time the unwrapped phase spectrum of the LPC residual is extracted. The average group delay value corresponding to the start of the analysis window is found by the slope of the linear regression fit. The subsequent filtering does not affect the temporal properties of the signal but eliminates possible fluctuations that could result in spurious zero crossing. The GCI is thus the zero crossing instant during the positive slope of average delay.

After estimation of the GCI, the LF model parameters are obtained from an iterative application of a dynamic time alignment method to an estimate of the glottal pulse sequence. The initial estimate of the glottal pulse is obtained via an LP inverse filter. The estimate of the parameters of LP model is based on a pitch synchronous method using periods of zero-excitation coinciding with the close phase of a glottal pulse cycle. The parameterization process can be divided into two stages:

(a) Initial estimation of the LF model parameters. An initial estimate of each parameter is obtained from analysis of an initial estimate of the excitation sequence. The parameter $T_e$ corresponds to the instant when the glottal derivative signal reaches its local minimum. The parameter AV is the magnitude of the signal at this instant. The parameter $T_p$ can be estimated as the first zero crossing to the left of $T_e$. The parameter $T_c$ can be found as the first sample, to the right of $T_e$, smaller than a certain preset threshold value. Similarly, the parameter $T_o$ can be estimated as the instant to the left of $T_p$ when the signal is lower than a certain threshold value and is constrained by the value of open quotient. It is particularly hard to obtain an accurate estimate of $T_a$ so it is simply set to $\frac{2}{3}*(T_e-T_c)$.

The apparent loss in accuracy due to this simplification is only temporary as after the non-linear optimization technique is applied, Ta is estimated as the magnitude of the normalized spectrum (normalized by AV) during the closing phase.

(b) Constrained non-linear optimization of the parameters. A dynamic time warping (DTW) method is employed. DTW time-aligns a synthetically generated glottal pulse with the one obtained through the inverse filtering. The aligned signal is a smoother version of the modeled signal, with its timing properties undistorted, but with no short term or other time fluctuations present in the synthetic signal. The technique is used iteratively, as the aligned signal can replace the estimated glottal pulse as the new template from which to estimate the LF parameters.

In another embodiment of the invention, an audio synchronization method is provided that provides an audio output that is substantially independent of a given speaker's personal characteristics. Once the output is generated, it is substantially similar for any number of speakers, regardless of any individual speaker characteristics. According to the invention, an audio/video system so configured can reduce or remove one or more of the effects of different speaker related voice characteristics.

Analysis is the methodological examination of information or data as will be known to the person of ordinary skill in the art from the teachings, including calculation and logical decisions and is preferred to be (but not limited to) observation from which a decision may be made.

Calculation is computation, ciphering, reckoning, estimation or evaluation of information or data by mathematics as will be known to the person of ordinary skill in the art from the teachings and is preferred to (but not required to) produce an logical or numerical output.

The person of ordinary skill will be able to implement appropriate analysis and/or calculation suitable to practice the invention in a form suitable for a particular application from the teachings herein.

The most important perceptual aspects of the human voice, are pitch, loudness, timbre and timing (related to tempo and rhythm). These characteristics are usually considered to be more or less independent of one another and they are considered to be related to the acoustic signal's fundamental frequency $f_0$, amplitude, spectral envelope and time variation, respectively.

It has been observed that one person's individual pitch, $f_0$, is determined by individual body resonance (chest, throat, mouth cavity) and length of one's vocal cords. Pitch information is localized in the lower frequency spectrum of one's voice. According to the invention, the novel methodology concentrates on assessing one's voice characteristics in frequency domain, then eliminating first few harmonics, or the entire lower frequency band. The result leaves the essence, or the harmonic spectra, of the individual intelligent sound, phoneme, produced by human speaking apparatus. The output is an audio output that is independent of a speaker's personal characteristics.

In operation, moments of Fourier Transform (or DCT)and Audio Normalization are used to eliminate dependency on amplitude and time variations, thus further enhancing the voice recognition methodology.

The moments are calculated as follows:

Let $f_i$ be the $i^{th}$ harmonic of the Fourier Transform (or DCT), and n be the number of samples with respect to 10 ms data, then the $k^{th}$ moment is defined as $$m_k = \frac{\sum_{i=0}^{n} i^k f_i}{\sum_{i=0}^{n} f_i}$$

The value of i is scaled so that it covers the full frequency range. In this case, only m (corresponding to 6 KHz) number of spectrum values are used out of n.

The $k^{th}$ central moment (for k>1) is defined as, $$\overline{m}_k = \frac{\sum_{i=0}^{n} (i^k - m_1) f_i}{\sum_{i=0}^{n} f_i}$$

From the above equation, we have $$\overline{m}_2 = m_2 - m_1^2$$

$$\overline{m}_3 = m_3 - 3m_1 m_2 + 2m_1^3$$

Other moments considered are, $$m_{20} = \frac{m_2}{m_1} - m_1$$

$$m_{23} = \frac{\overline{m}_3}{\overline{m}_2}$$

$$m_{24} = \frac{\overline{m}_{23}}{\sqrt{\overline{m}_2}}$$

Figure 10:
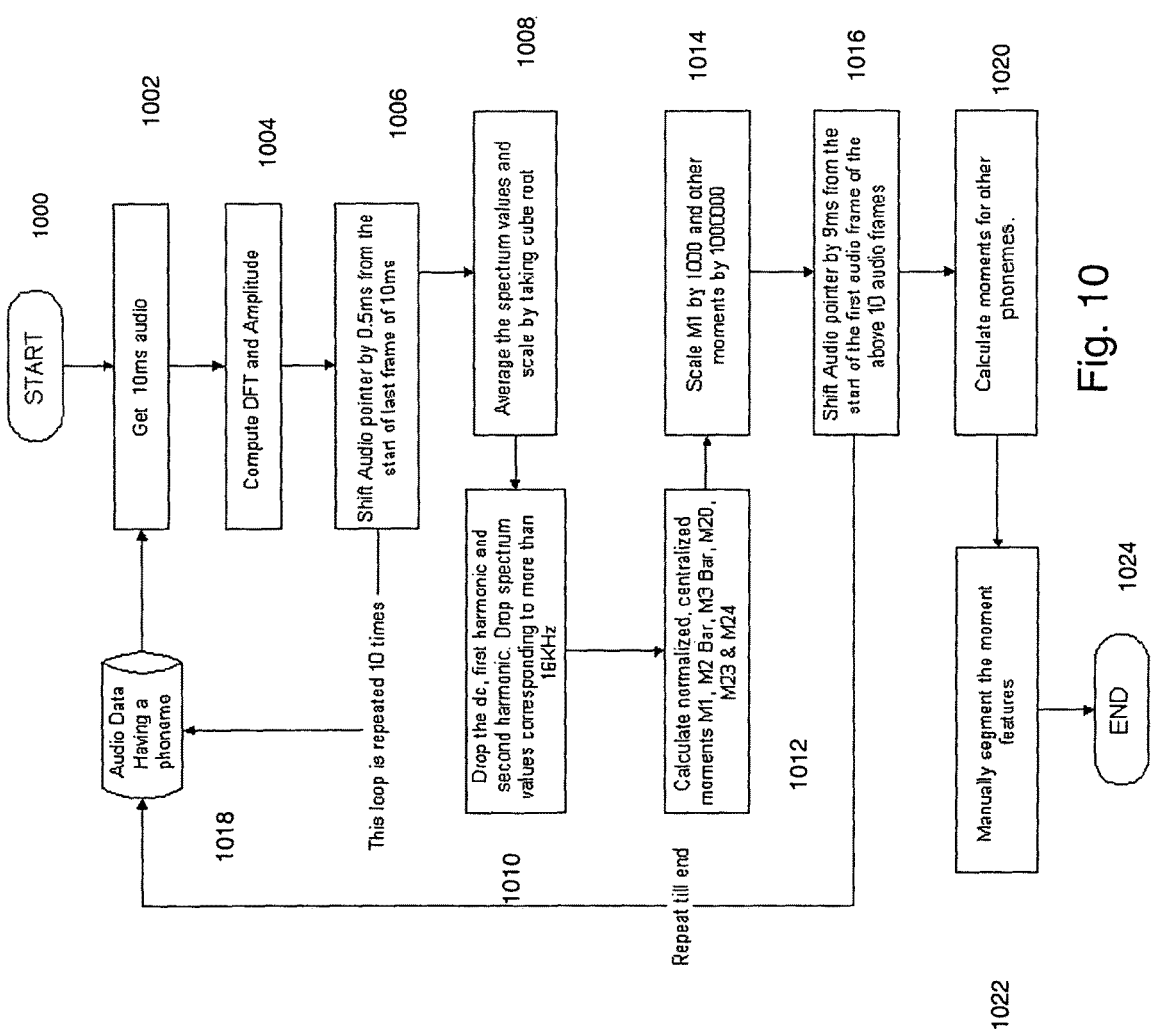
FIG. 10 is a flow chart illustrating the process for removing the personal voice characteristics from an audio portion of an audio/video presentation according to the invention.

Referring to FIG. 10, one embodiment of a method according to the invention is illustrated. The process is illustrated in FIG. 10, beginning at Step 1000. The process begins at Step 1002, where an audio sample is retrieved, for example, 10 milliseconds in this step, and the DFT and amplitude are computed in Step 1004. In Step 1006, the audio pointer is shifted by an incremental value, for example, 0.5 milliseconds in this example, from the start of the last frame of the sample from 1002. From here, this loop is repeated for a predetermined number of times, 10 cycles in this example, and the process returns to the storage 1018, containing audio data having phoneme. Again this loop is repeated 10 times, then the process proceeds to Step 1008, where a process of averaging the spectrum values and scale by taking cube root is performed. The process then proceeds to Step 1010, where the DC value, the first harmonic and the second harmonic are dropped. Also, the spectrum values corresponding to more than a predetermined frequency, 16 kilohertz in this example, are dropped as well. The process then proceeds to Step 1012, where the normalized, centralized moments are calculated for M1 M2 BAR, M3 BAR, M20, M23 and M24. In Step 1014, M1 is scaled by 1000 and other moments are scaled by 1,000,000. In Step 1016, the audio pointer is shifted by a predetermined amount of time, 9 milliseconds in this example, from the start of the first audio frame of the initial audio frames from Steps 1002 through 1008. In Step 1020, the moments for other phonemes are calculated. In Step 1022, the moment features are segmented. The process ends at 1024. The values and process steps described, in connection with FIG. 10, as will be understood by those skilled in the art, like in our own examples, and other values may be used without parting from the spirit and scope of the invention, as is defined in the appended claims and their equivalents.

With respect to an implementation for lip tracking to relate audio to video synchronization, moments of Fourier Transform (or DCT) of 10 ms audio are considered as phoneme features. In one implementation, the Fourier Transforms (or DCT) for 9 more sets are calculated by shifting 10% samples. The average of the spectrum of these Fourier Transform (or DCT) coefficients are used for calculating moment features. The first three spectrum components are dropped while calculating moments. The next set of audio samples are taken with 10% overlap. The moments are then scaled and plotted pair-wise. The segmentation allows plotting on the x/y plot in two-dimensional moment space.

As defined herein, lip shape and mouth shape are distinguishable. Thus, lip shape is lips only whereas mouth shape includes lips and other shapes, such as for example mouth cavity, teeth and other mouth characteristics. Given this disclosure of the invention, those skilled in the art will understand that the different shapes of and around the mouth area can be analyzed and utilized in the system and process according to the invention.

"For viseme recognition, a process based on average gradient around the lip area has been implemented that accurately extracts the lip region. Three lip areas are defined as: "outer lip area" that encloses the whole mouth region., "inner lip area" that defines the region of mouth opening and teeth, and the "lip area", which is the difference between "outer lip area" and "inner lip area", which defines the region of upper and lower lip . . . The process accurately detects closed lips, wide open mouth, as well as various mouth shapes and openings. The process also accurately detects teeth within the "inner lip area". This is done by detecting the level of brightness within the "inner lip area". Wide open mouth can be classified as /AA/, closed lips with no teeth present as /M/, /P/, /B/, and, when teeth are present as /V/, /EE/, /F/, /Z/, /ZZ/ (like in pizza) and /S/. The correspondence with mouth shape and sound can be established.

While the invention has been described in the preferred embodiment with various features and functions herein by way of example, the person of ordinary skill in the art will recognize that the invention may be utilized in various other embodiments and configurations and in particular may be adapted to provide desired operation with preferred inputs and outputs without departing from the spirit and scope of the invention. Those skilled in the art will also understand, the invention may be practiced in various forms (steps, methods, hardware, software, firmware, etc.) and as part of, embedded in or as a feature of other devices, systems, processes and methods.

The invention claimed is:

1. A method for measuring audio video synchronization, comprising:
receiving video and associated audio information;
analyzing the audio information to locate the presence of sounds therein related to a speaker's personal voice characteristics;
removing data related to the speaker's personal voice characteristics to produce a filtered audio representation;
analyzing the filtered audio representation to identify particular sounds;
analyzing the video information related to the calculation of width and height of lips which form mouth shapes corresponding to the formation of particular sounds, and
comparing the location of the particular sounds with the location of the corresponding mouth shapes to produce a non-transitory measurement of the relative timing.

2. A method of measuring audio video synchronization, comprising:
acquiring input audio video information into an audio video synchronization system;
analyzing the audio information to identify audio data related to the presence of sounds therein related to a speaker's personal voice characteristics;
removing the identified audio data related to a speaker's personal voice characteristics to produce a filtered audio representation;
analyzing the filtered audio information;
analyzing the video information including mouth shapes and the position of the mouth shapes;
calculating an Audio MuEv and a Video MuEv from the audio and video information; and
determining and associating a dominant audio class in a video frame, locating matching locations, and estimating a non-transitory offset of audio and video timing.

3. The method of claim 2, wherein acquiring input audio video information into an audio video synchronization system comprises:
receiving audio video information;
separately extracting the audio information and the video information;
analyzing the audio information and the video information, and recovering audio and video analysis data therefrom; and
storing the audio and video analysis data and recycling the audio and video analysis data.

4. The method of claim 3, further comprising providing scatter diagrams of audio moments from the audio data.

5. The method of claim 4, further comprising providing an audio decision boundary and storing the resulting audio decision data.

6. The method of claim 3, further comprising providing scatter diagrams of video moments from the video data.

7. The method of claim 6, further comprising providing a video decision boundary and storing the resulting video decision data.

8. The method of claim 5, wherein analyzing the audio information comprises:
receiving an audio stream until the fraction of captured audio samples attains a threshold;
finding a glottal pulse of the captured audio samples;
calculating a Fast Fourier Transform (or DCT) for sets of successive audio data of the size of the glottal pulse within a shift;
calculating an average spectrum of the Fast Fourier Transforms (or DCTs);
calculating audio statistics of the spectrum of the Fast Fourier Transforms (or DCTs) of the glottal pulses; and
returning the audio statistics.

9. The method of claim 8, wherein the audio statistics include at least one of the centralized and normalized Moments of the Fourier Transform (or DCT).

10. The method of claim 9, wherein the audio statistics include at least one of the centralized and normalized Moments of the Fourier Transform (or DCT), including one of mean (M1), $2^{nd}$ Moment(M2BAR), and $3^{rd}$ Moment (M3BAR).

11. The method of claim 8, wherein finding a glottal pulse of the captured audio samples comprises:
receiving 3N audio samples; and
for i=0 to N samples, i) determining the Fast Fourier Transform (or DCT) of N+1 audio samples;
ii) calculating a sum of the first four odd harmonics, S(I);
iii) finding a local minima of S(I) with a maximum rate of change, S(K); and
iv) calculating the glottal pulse, GP=(N+K)/2.

12. The method of claim 2, wherein analyzing the video information comprises:
receiving a video stream and obtaining a video frame therefrom;
finding a lip region of a face in the video frame;
if the video frame is a silence frame, identifying the frame as silence, then resuming receiving a subsequent video frame; and
if the video frame is not a silence frame, performing the following steps:
defining inner and outer lip regions of the face;
calculating mean and variance of the inner and outer lip regions of the face;
calculating the width and height of the lips;
determining the inner space between the lips; and
returning video features and receiving the next frame.

13. The method of claim 2, wherein determining and associating a dominant audio class in a video frame comprises:
receiving a stream of audio and video information;
retrieving individual audio and video information therefrom;
analyzing the audio and video information including the inner lip region, whether the lips are open or closed, and classifying the audio and video information;
filtering the audio and video information to remove randomly occurring classes;
associating most dominant audio classes to corresponding video frames;
finding matching locations; and
estimating an asynchronous offset.

14. The method of claim 13, further comprising classifying the audio and video information into vowel sounds including AA, EE, OO, silence, and unclassified phonemes.

15. A system for measuring audio video synchronization, the system configured to:
acquire input audio video information into an audio video synchronization system;
analyze the audio information to identify the presence of sounds related to a speaker's personal voice characteristics;
remove the identified audio data related to a speaker's personal voice characteristics to produce a filtered audio representation;
analyze the filtered audio representation to identify particular sounds and silence;
analyze the video information including mouth shapes corresponding to classified sounds;
calculate an Audio MuEv and a Video MuEv from the filtered audio and video information; and
determine and associate a dominant audio class in a video frame, locate matching locations, and estimate offset of audio and video.

16. The system of claim 15 wherein acquiring input audio video information comprises:
receiving audio video information;
separately extracting the audio information and the video information;
analyzing the audio information and the video information, and recovering audio and video analysis data therefrom; and
storing the audio and video analysis data and recycling the audio and video analysis data.

17. The system of claim 16, further configured to draw scatter diagrams of audio moments from the audio data.

18. The system of claim 17, further configured to draw an audio decision boundary and store the resulting audio decision data.

19. The system of claim 16, further configured to draw scatter diagrams of video moments from the video data.

20. The system of claim 19, further configured to draw a video decision boundary and store the resulting video decision data.

21. The system of claim 18, wherein analyzing the audio information comprises:
receiving an audio stream until the fraction of captured audio samples attains a threshold;
finding a glottal pulse of the captured audio samples;
calculating a Fast Fourier Transform (or DCT) for sets of successive audio data of the size of the glottal pulse within a shift;
calculating an average spectrum of the Fast Fourier Transforms (or DCTs);
calculating audio statistics of the spectrum of the Fast Fourier Transforms (or DCTs) of the glottal pulses; and
returning the audio statistics.

22. The system of claim 21, wherein the audio statistics include one or more of the centralized and normalized Moments of the Fourier Transform (or DCT).

23. The system of claim 21, wherein finding a glottal pulse of the captured audio samples comprises:
receiving 3N audio samples; and
for i=0 to N samples,
determining the Fast Fourier Transform (or DCT) of N+1 audio samples;
calculating a sum of the first four odd harmonies, S(I);
finding a local minima of S(I) with a maximum rate of change, S(K); and
calculating the glottal pulse, GP=(N+K)/2.

24. The system of claim 18 wherein analyzing the video information comprises:
receiving a video stream and obtaining a video frame therefrom;
finding a lip region of a face in the video frame;
if the video frame is a silence frame, identifying it as silence, then resuming receiving a subsequent video frame; and
if the video frame is not a silence frame,
defining inner and outer lip regions of the face;
calculating mean and variance of the inner and outer lip regions of the face;
calculating the width and height of the lips;
calculating the inner space between the lips; and
returning video features and receiving the next frame.

25. The system of claim 18 wherein determining and associating a dominant audio class in a video frame comprises:
receiving a stream of audio and video information;
retrieving individual audio and video information therefrom;
analyzing the audio and video information and classifying the audio and video information including analyzing whether the inner lip region indicates an open mouth;
filtering the audio and video information to remove randomly occurring classes;

associating most dominant audio classes to corresponding video frames;
finding matching locations; and
estimating an asynchronous offset.

26. The system of claim 25 wherein the system is further configured to classify the audio and video information into vowel sounds including AA, EE, OO, silence, and unclassified phonemes.

27. A non-transitory computer-readable storage medium embodying a program of machine-readable instructions, executable by a digital processor to perform operations to measure audio video synchronization:
   a) receiving video and associated audio information;
   b) analyzing the audio information to identify the presence of sounds therein related to a speaker's personal voice characteristics;
   c) removing audio data related to the identified sounds of a speaker's personal voice characteristics to produce a filtered audio representation;
   d) analyzing the audio information to locate the presence of glottal events therein;
   e) analyzing the video information to determine mouth shapes in response to calculated width and height of lips corresponding to the glottal events; and
   f) analyzing the location and/or presence of the glottal events located in step d) and corresponding video information of step e) to determine the relative timing thereof.

28. A method of analyzing video information from a video signal, comprising:
   receiving a video stream and obtaining a single video frame therefrom;
   defining a lip region of a face in the video frame;
   if the video frame is a silence frame, identifying the frame as silence, then resuming receiving a subsequent video frame; and
   if the video frame is not a silence frame,
      defining inner and outer lip regions of the face;
      calculating non-transitory mean and variance measurements of the mouth shapes;
      calculating non-transitory width and height measurements of the lips; and
      returning video features and receiving the next frame.

29. The method of claim 28, further comprising classifying the audio and video information into vowel sounds including AA, EE, OO, F, V, B, silence, and unclassified phonemes.

30. The method of claim 29, further comprising classifying the audio and video information into vowel sounds including AA, EE, OO, silence, and unclassified phonemes, and if the mouth is open, classifying the audio and video information into vowel sounds including AA, EE, OO, and if the lips are closed, classifying the audio and video information into sounds including pronunciation of the letters M, P, B, V and when teeth are present, classifying the audio and video sounds as EE and the pronunciation of the letter S.

31. A method of determining the relative timing of an audio program and a video program, comprising:
   receiving a video program and identifying therein an image of a face in a single video frame;
   identifying the shape of the mouth on the face in response to calculating the width and height of the lips;
   receiving the audio program and identifying sounds therein that correspond to the lip shape of the mouth; and
   producing non-transitory measurements of occurrences in time of the identified shape of the mouth and corresponding sounds to determine whether the timing of the two are the same.

32. The method of claim 31, wherein the magnitude of timing between the occurrence of the identified shape and the occurrence of the corresponding sound is determined.

33. A method of obtaining information relating to an audio program and a video program, comprising:
   receiving a video program and identifying therein an image of a face,
   identifying the shape of the lips on the face in a single frame of video;
   receiving an audio program and identifying sounds therein that correspond to the shape of the mouth; and
   using the identified shape of the lips and corresponding sounds to obtain non-transitory measurement information.

34. The method of claim 33, wherein the non-transitory measurement information obtained is the relative timing of the audio program relative to the video program.

35. The method of claim 33, wherein the non-transitory measurement information obtained is verification of the audio program corresponding to the video program.

* * * * *